(12) United States Patent
Singh et al.

(10) Patent No.: US 7,657,693 B2
(45) Date of Patent: Feb. 2, 2010

(54) ROUTER TO USE THREE LEVELS OF ARBITRATION FOR A CROSSBAR CHANNEL

(75) Inventors: Arvind Pratap Singh, Pratapgarth (IN);
Sriram R. Vangal, Portland, OR (US);
Yatin V. Hoskote, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 125 days.

(21) Appl. No.: 11/905,292

(22) Filed: Sep. 28, 2007

(65) Prior Publication Data
US 2009/0089478 A1    Apr. 2, 2009

(51) Int. Cl.
*G06F 13/00* (2006.01)
(52) U.S. Cl. .................. 710/317; 710/316; 710/110
(58) Field of Classification Search ............. 710/29–32, 710/36–42, 113–119, 305–306, 313–317, 710/240, 104–110; 370/380, 388, 422
See application file for complete search history.

(56) References Cited

U.S. PATENT DOCUMENTS

| | | | |
|---|---|---|---|
| 6,628,662 B1 | 9/2003 | Blackmon et al. | 370/447 |
| 6,717,945 B1 | 4/2004 | Jue et al. | 370/392 |
| 6,791,376 B2 | 9/2004 | Vangal | 327/99 |
| 7,016,365 B1 | 3/2006 | Grow et al. | 370/413 |
| 7,023,841 B2 | 4/2006 | Dell et al. | 370/388 |
| 7,200,699 B2* | 4/2007 | Bose et al. | 710/120 |
| 7,336,190 B2* | 2/2008 | Giordano et al. | 340/608 |
| 2005/0117575 A1* | 6/2005 | Konda | 370/389 |

OTHER PUBLICATIONS

"An 80-Tile 1.28TFLOPS Network-on-Chip in 65nm CMOS;" Sriram Vangal et al.;2007 IEEE International Solid-State Circuits Conference; pp. 5-7.
"A Six-Port 30-G/s Nonblocking Router Component Using Point-to-Point Simultaneous Bidirectional Signaling for High-Bandwidth Interconnects;" Howard Wilson and Mathew Haycock; IEEE Journal of Solid-State Circuits, vol. 36, No. 12, Dec. 2001; pp. 1954-1963.

* cited by examiner

*Primary Examiner*—Raymond N Phan
(74) *Attorney, Agent, or Firm*—KED & Associates, LLP

(57) ABSTRACT

A router is provided that includes a plurality of lanes to receive inbound data from a plurality of different input ports. The router may further include a shared crossbar channel coupled to each of the lanes and to a plurality of output ports, the crossbar channel to receive inbound data from the plurality of lanes and to provide outbound data to the plurality of output ports. Each lane may include a local lane arbiter, a global lane arbiter and a port arbiter associated with each port.

18 Claims, 4 Drawing Sheets

ROUTER TO USE THREE LEVELS OF ARBITRATION FOR A CROSSBAR CHANNEL

BACKGROUND

1. Field

Embodiments of the present invention may relate to crossbar channel routers.

2. Background

Multi-processor systems may be designed and implemented for high processing power. Multi-processor systems transfer data among processors, memories and other components. The processors may be interconnected for sharing and transferring data. Crossbar channel routers may interconnect multi-processor systems.

BRIEF DESCRIPTION OF THE DRAWINGS

Arrangements and embodiments may be described in detail with reference to the following drawings in which like reference numerals refer to like elements and wherein.

DETAILED DESCRIPTION

Figure 1:
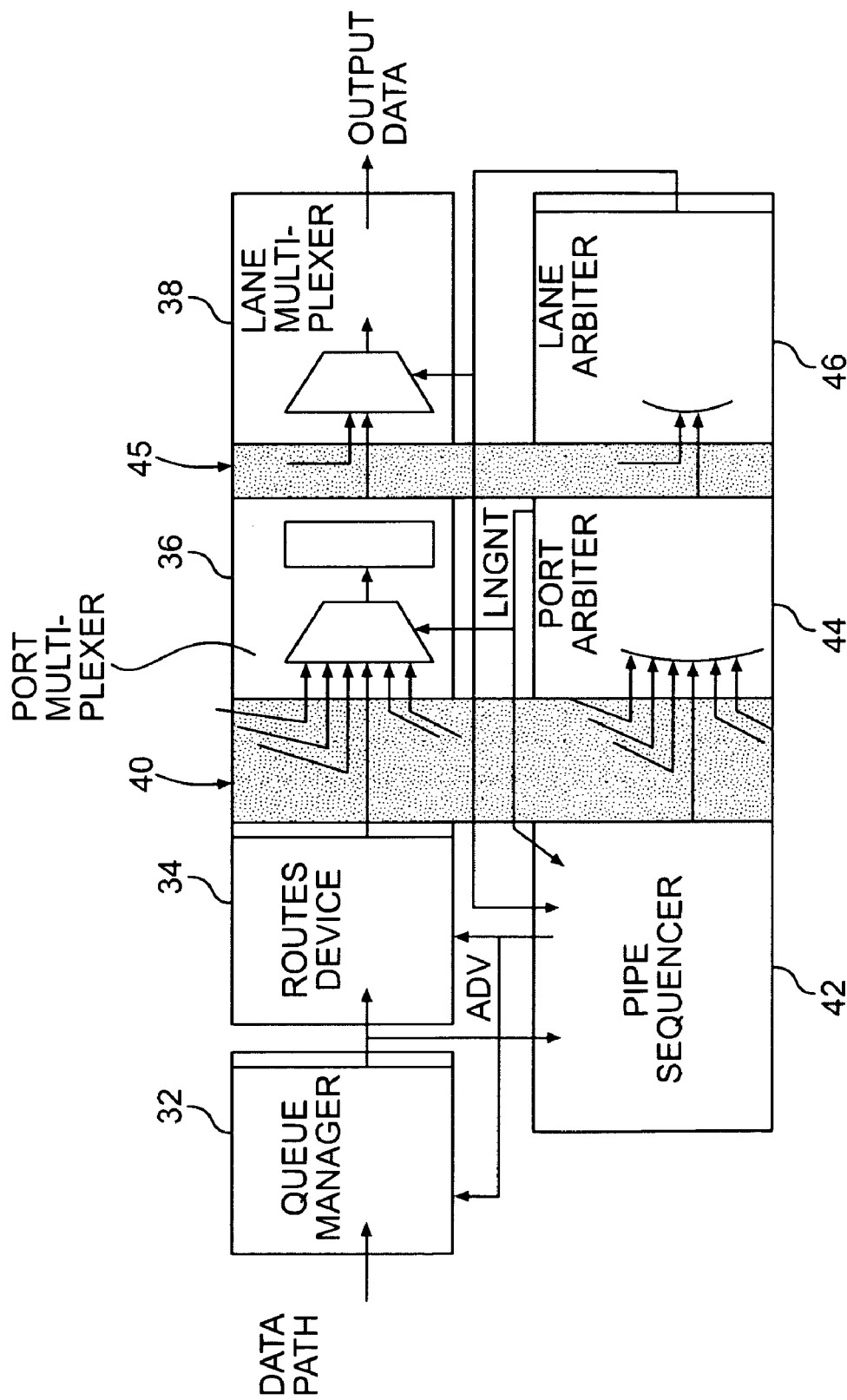
FIG. 1 shows a router data and control pipeline according to an example arrangement.

In the following description, like reference numerals may be used to designate identical, corresponding or similar components in different drawings. Where specific details are set forth in order to describe example embodiments, it should be apparent to one skilled in the art that embodiments may be practiced without these details.

In the following discussion, a crossbar router and/or a crossbar channel router will be discussed. Embodiments are also applicable to a crossbar switch and/or other devices utilizing a crossbar (or crossbar channel). As used hereafter, the term lane may refer to a channel.

A six-port and two lane router architecture may have internal crossbars. For example, a Lane 0 may be associated with input ports IP0-IP5, queues, logic, a crossbar channel, memory buffers and output ports OP0-OP5. Likewise, a Lane 1 may be associated with input ports IP0 to IP5, queues, logic, a crossbar channel and memory buffers. Accordingly, two crossbar channels may be used for two separate lanes (or channels). Each Lane 0 and Lane 1 may accommodate data from different packets simultaneously.

FIG. 1 shows a six-stage data and control pipeline according to an example arrangement. Other arrangements may also be used. FIG. 1 shows six-stages although other numbers of stages may also be used. This logic may be duplicated throughout a crossbar channel router or other device having a crossbar channel. More specifically, the pipeline shown in FIG. 1 may be duplicated six times for each lane of a crossbar channel router having six input ports. FIG. 1 also shows a distributed arbitration scheme for lane and port arbitration. More specifically, FIG. 1 shows that the data path pipeline includes a queue manager 32, a router device 34, a port multiplexer 36 and a lane multiplexer 38. FIG. 1 also shows that the control path pipeline includes a pipe sequencer 42, a port arbiter 44 and a lane arbiter 46.

An input data path (shown as Data Path) is provided to an input port of the queue manager 32. The queue manager 32 may include one or more queue stages. The queue manager 32 may provide data to the router device 34 which may include router and sequencing logic to provide control signals to the pipe sequencer 42. The pipe sequencer 42 may include router and sequencing logic to provide control signals to the port arbiter 44 to arbitrate the port multiplexer 36 and provide control signals to the lane arbiter 46 to arbitrate the lane multiplexer 38. For example, the lane multiplexer 36 may include a n:1 multiplexer, where n represents a number of input ports (and number of output ports). The lane multiplexer 38 may include an m:1 multiplexer, where m represents a number of lanes. The lane multiplexer 38 may provide output data (shown as output data) to a corresponding output port.

The area 40 between the router device 34/pipe sequencer 42 and the lane multiplexer 36/lane arbiter 44 represents a routing channel where data and control signals are provided from the plurality of input ports of a specific lane. The area 45 between the lane multiplexer 36/port arbiter 44 and the lane multiplexer 38/lane arbiter 46 represents another routing channel where data and control signals are provided for output ports of a specific lane. The areas 40, 45 representing the two main routing channels may be perpendicular to each other on the die.

The architecture shown in FIG. 1 has two levels of arbitration, namely port arbitration and lane arbitration. Arbitration may involve grants or providing ownership to a particular port or lane. For example, the port arbiter 44 may provide ownership (or grant ownership) to data from one requesting input port (or inbound data) for an output port of the specific lane at packet granularity. The data receiving the ownership (or grant) may be stored in a memory buffer of the port multiplexer 36 for the lane multiplexer 38. The lane arbiter 46 may provide ownership (or grant ownership) to one output port. This distributed arbitration scheme may be replicated for each lane to realize full arbitration at a crossbar router level.

The crossbar channel area for each lane may be on an order of $[n*w]^2$, where n represents a number of ports and w represents a number of bits per port. For "l" number of lanes, the crossbar channel area may be on the order of $l*[n*w]^2$ for a multi-lane crossbar router design. Therefore, as the number of lanes increases, the crossbar channel area may also increase. This allows a greater amount of area and therefore more electronic components. However, more components may lead to greater power consumption.

Embodiments of the present application are directed to a crossbar channel router having a distributed arbitration scheme. The distributed arbitration scheme may be based on three levels of arbitration, namely local lane, global lane and port arbitration. The three levels of arbitration may be provided within each port of each lane of the router (or other device).

Figure 2:
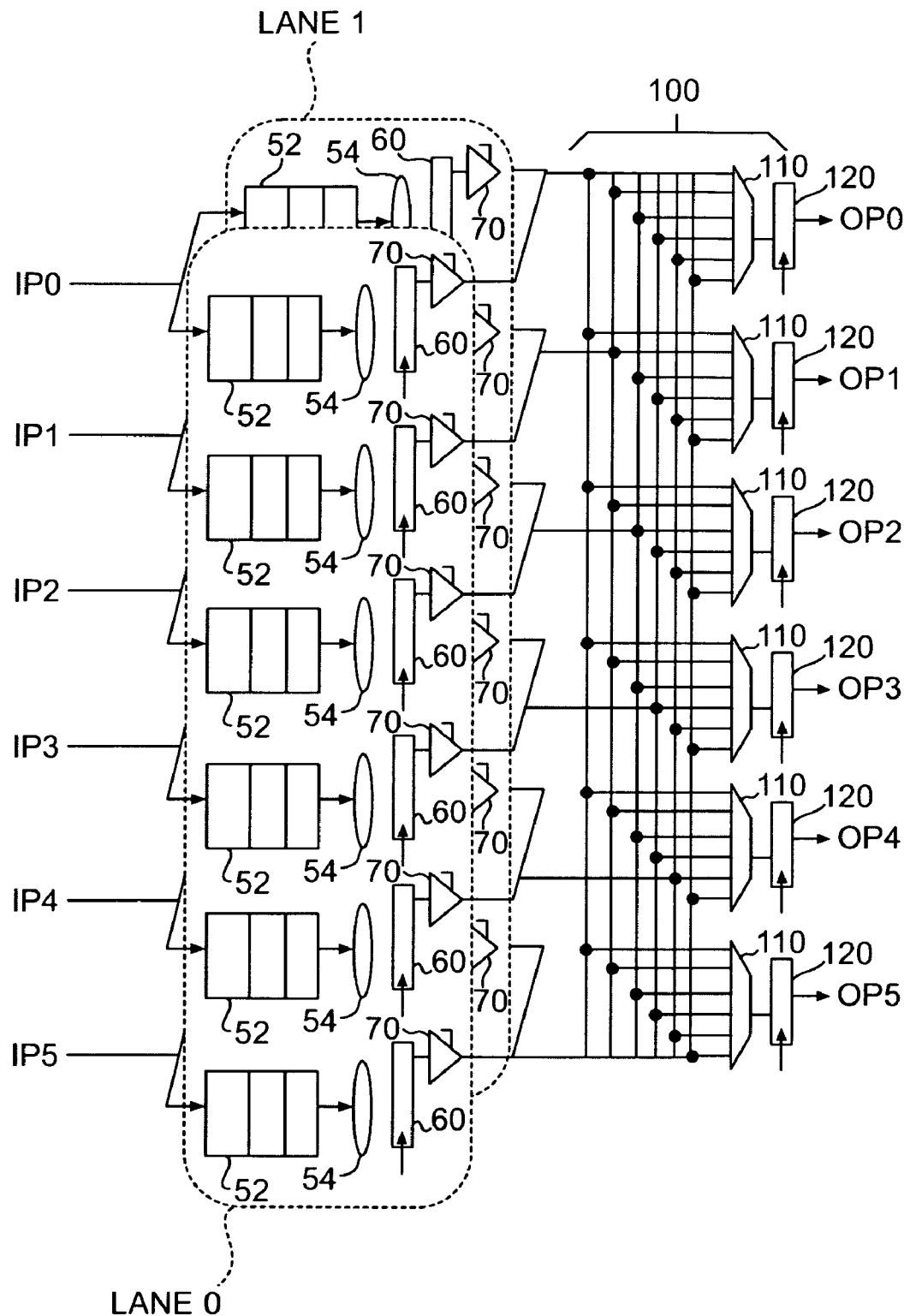
FIG. 2 shows a crossbar channel router architecture according to an example embodiment of the present invention.

FIG. 2 shows a crossbar channel router architecture according to an example embodiment of the present invention. Other embodiments and configurations are also within the scope of the present invention. FIG. 2 shows two lanes, namely Lane 0 and Lane 1, coupled to a shared crossbar channel 100. Although not shown, the router architecture may include other numbers of lanes also coupled to the shared crossbar channel 100. FIG. 2 also shows six input ports IP0-IP5 and six output ports OP0-OP5 for the architecture. Stated differently, FIG. 2 shows an architecture for two lanes based on a shared crossbar channel (i.e., the crossbar channel 100).

Lane 0 and Lane 1 are each coupled to a plurality of input ports IP0-IP5. These input ports IP0-IP5 may be considered external (or internal) to the respective lanes. Lane 0 includes a plurality of input queues 52 and a plurality of memory buffers 54 to form memory storage for input data from the respective input ports IP0-IP5. Lane 1 also includes the plurality of input queues 52 and the memory buffers 54 to form memory storage for input data from the respective input ports IP0-IP5. Each input port of each lane may be associated with separate input queues 52 and memory buffer 54.

Each of the memory buffers 54 may be separately coupled to a plurality of logic 60 and to an output driver 70 to provide data to the shared crossbar channel 100. As one example, each memory buffer 54 may be associated with one logic 60 and one output driver 70.

The logic 60 in each lane (and for each input port) may include a port arbiter, a global lane arbiter and a local lane arbiter so as to provide a distributed arbitration scheme. The port, global lane and local lane arbiters may operate in a lock-step manner to forward data through the crossbar channel router architecture. This distributed arbitration scheme allows for sharing of the single crossbar channel 100 independent of a number of lanes in the architecture. The output driver 70 may provide the data selected by the arbiters from the memory buffer 54 to the crossbar channel 100.

As shown in FIG. 2, the crossbar channel 100 may receive data from each of the different lanes (and from different input ports of each of the lanes). The crossbar channel 100 may include multiplexers 110 to select the appropriate output data based on the distributed arbitration scheme. Each of the multiplexers 110 may be coupled to a corresponding one of a plurality of output buffers 120. Data output from one multiplexer 110 of the crossbar channel 100 may be provided to a corresponding output buffer 120. Each of the output buffers 120 may be associated with a corresponding output port so as to provide the respective data. Accordingly, the shared crossbar channel 100 provides output data to the output buffers 120 corresponding to the output ports OP0-OP5.

Figure 3:
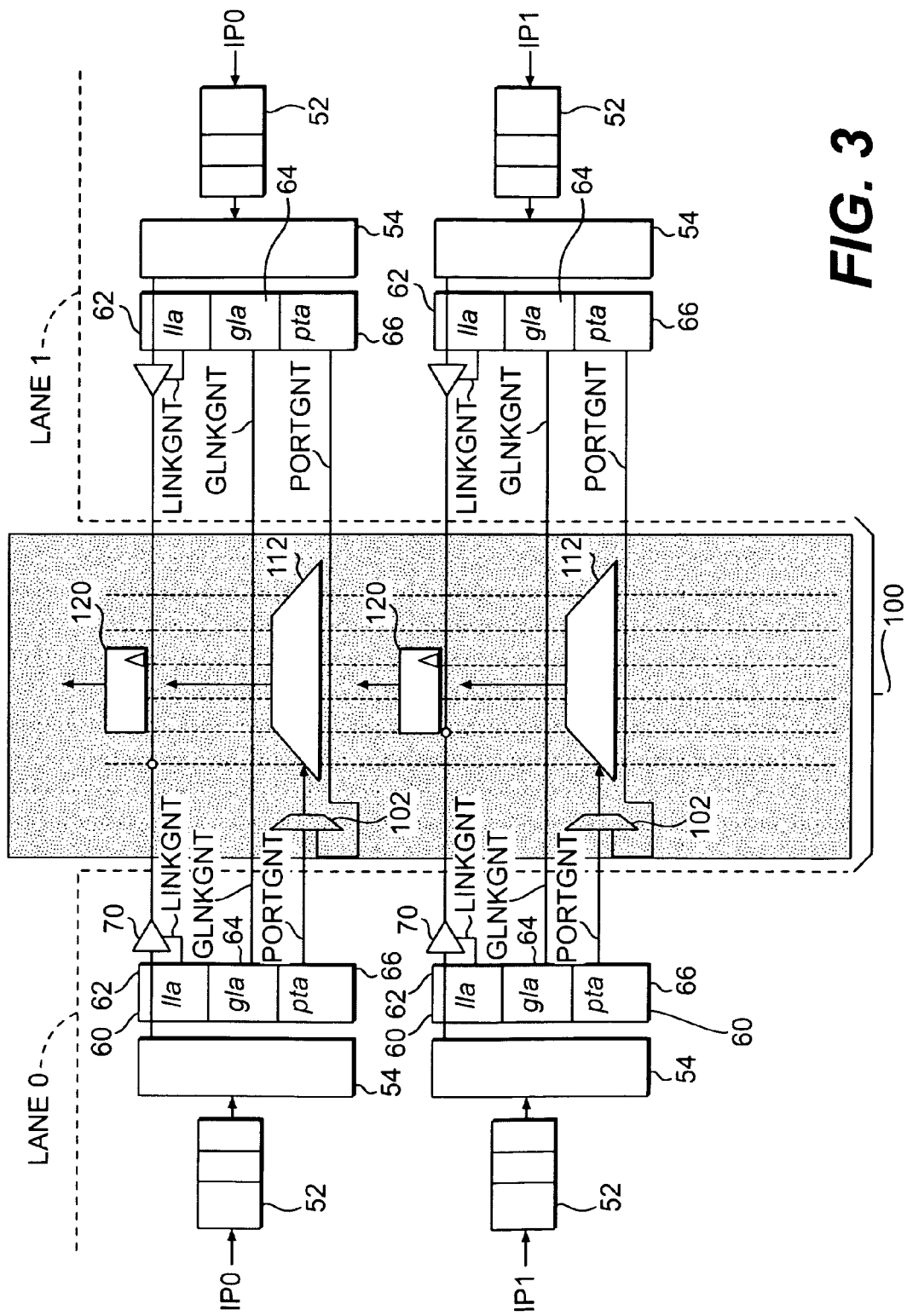
FIG. 3 shows a crossbar channel router having a distributed arbitration scheme according to an example embodiment of the present invention.

FIG. 3 shows a crossbar channel router having a distributed arbitration scheme according to an example embodiment of the present invention. Other embodiments and configurations are also within the scope of the present invention. More specifically, FIG. 3 shows that the router may incorporate the shared crossbar channel 100 and may thereby reduce the crossbar channel area.

More specifically, FIG. 3 shows Lane 0, Lane 1 and the shared crossbar channel 100. Although not shown, the router may include other numbers of lanes (such as four lanes) also coupled to the shared crossbar channel 100. Lane 0 and Lane 1 each share the same crossbar channel 100 for data transferring and for interconnecting processors. Similar to FIG. 2, each lane may be associated with a plurality of input ports, although only input ports IP0 and IP1 are shown for each lane in FIG. 3. The input ports IP0-IP1 may be considered external (or internal) to the respective lanes.

Lane 0 includes the plurality of input queues 52 and the plurality of memory buffers 54 to form memory storage for input data from the respective input ports IP0-IP1. Lane 1 also includes the plurality of input queues 52 and the memory buffers 54 to form memory storage for input data from the respective input ports IP0-IP1. Each input port may be associated with separate input queues 52 and the memory buffer 54. Input data may be transferred to the corresponding memory buffer 54 in response to port arbitration by the port arbiter.

The logic 60 of each lane may include three levels of arbitration, namely local lane arbitration (shown as lla), global lane arbitration (shown as gla), and port arbitration (shown as pta). This differs from the two levels of arbitration discussed above with respect to FIG. 1. Each level of arbitration may involve grants or providing ownership to a particular port or lane. The shared crossbar channel router may have one port arbiter for each input port of each lane.

More specifically, the logic 60 of each port may include a local lane arbiter 62, a global lane arbiter 64 and a port arbiter 66. Local lane arbitration of the port may be performed by the local lane arbiter 62, global lane arbitration of the port may be performed by the global lane arbiter 64, and port arbitration of the port may be performed by the port arbiter 66. The local lane arbiter 62, the global lane arbiter 64 and the port arbiter 66 may collectively form the logic 60.

The port arbiter 66 may grant one inbound port request for inbound data in a respective lane. The grant may hereafter be referred to as a port grant. Input data may be transferred to the corresponding memory buffer 54 in response to the port arbitration by the port arbiter 66 (shown as portgnt). The port arbiter 66 may be a round robin arbiter based on packet level switching. The port arbiter 66 may also be a priority based arbiter. Other types of arbiters may also be used.

Each lane may also include one local lane arbiter 62 and one global lane arbiter 64 per input port. The local lane arbiter 62 may grant one inbound data request for the shared crossbar channel 100. The global lane arbiter 64 may grant one outbound data request from the shared crossbar channel. The local lane arbiter 62 and the global lane arbiter 64 may work at flit granularity and may be based on a round robin scheme. The arbitration of local lane and the port may be performed in parallel. Stated differently, the local lane arbiter 62 may generate a local lane grant and the global lane arbiter 64 may generate a global lane grant. The local lane arbiter 62 may be a round robin arbiter, a priority based arbiter or another type of arbiter. The global lane arbiter 64 may be a round robin arbiter, a priority based arbiter or another type of arbiter.

The three levels of arbitration may occur. The port arbiter 66 may grant one inbound port request for inbound data in each lane. The local and global lane requests may be generated in parallel based on the grant by the port arbiter 66 (shown as portgnt). The local lane arbiter 62 and the global lane arbiter 64 may work in parallel and generate a local lane grant (shown as llnkgnt) and a global lane grant (shown as glnkgnt), respectively. When an inbound data in an input port receives all three grants (i.e., a port grant, a local lane grant and a global lane grant), then the driver 70 may be enabled and the data may be transferred (or moved) from the memory buffer 54 (and/or input queues 52) to the crossbar channel 100.

Accordingly, embodiments of the present invention may provide a router having three levels of arbitration in which the arbitration includes the port arbiter to grant one inbound data request (i.e., a port grant) for inbound data in each lane, the local lane arbiter to generate a local lane grant, the global lane arbiter to generate a global lane grant, and transferring data to the shared crossbar channel in response to the inbound data request (i.e., the port grant), the local lane grant and the global lane grant.

The shared crossbar channel 100 may include a plurality of m:1 lane multiplexers 102 each for selecting one of m lanes, for example, and a plurality of n:1 port multiplexers 112 each for selecting one of n output ports. In FIG. 3, the m:1 multiplexers 102 may be 2:1 lane multiplexers that receive data from each of Lane 0 and Lane 1. Likewise, the n:1 multiplexers 112 may be 6:1 lane multiplexers that output data from the shared crossbar channel 100 to one of six output ports. More specifically, the n:1 port multiplexers 112 output the data to the corresponding output buffer 120 of a requesting port in response to the global lane arbitration.

The output driver 70 may be a tri-state buffer to provide data from the memory buffers 54. The output driver 70 may be enabled based on the local lane grant arbitration (shown as llnkgnt) by the local lane arbiter 62 such that data is transferred from the memory buffer 54 (and/or the input queue 52) to the shared crossbar channel 100. More specifically, when inbound data gets a local grant (shown as llnkgnt), the corresponding output driver 70 (or tri-state buffer) may be enabled and data may be forwarded (or transmitted) from the memory buffer 54 to the shared crossbar channel 100. This may occur for each of the respective input ports (i.e., from each lane). This may also be referred to as an inbound data request.

Signals, such as portgnt, from the port arbiters 66 of each lane (for an input port) may be provided as inputs to the lane multiplexers 102. Signals, such as glnkgnt, from the global arbiters 64 in each of the lanes (for an input port) may be provided as select signals to the lane multiplexers 102. The output of the lane multiplexer 102 is provided as a select signal to the respective port multiplexer 112 (corresponding to a respective output buffer and output port). The multiplexer 112 thereby outputs data to the output buffer 120 based on the select signal from the corresponding lane multiplexer 102.

Stated differently, a token (or grant) for each output port may be generated based on the port arbitration by the port arbiter 66 in each lane. For example, one token (or grant) from Lane 0 or Lane 1 may be selected based on a global lane grant (shown as glnkgnt) from the selected Lane 0 or Lane 1. This port token, such as signal portgnt, may be a select signal for the respective n:1 port multiplexer 112. The output data of the n:1 port multiplexer 112 may be forwarded to the corresponding output buffer 120.

As stated above, the port arbiter 66, the global lane arbiter 64 and the local lane arbiter 62 may operate in a lock-step manner to forward data through the router architecture (such as through the crossbar channel 100). However, the local lane arbiter 62 and the global lane arbiter 64 may become unsynchronized (or out-of-sync). Embodiments of the present invention may also include a deadlock recovery circuit to generate a deadlock signal based on local lane grants (shown as llnkgnt) and global lane grants (shown as glnkgnt). When a deadlock (or potential deadlock) is detected, the deadlock recovery circuit may make the local lane request LOW. Stated differently, upon detection of a potential deadlock, data may not be forwarded to the crossbar channel 100. This may help to synchronize the local lane arbiter 62 and the global lane arbiter 64 such that the architecture comes out of deadlock (or avoid deadlock).

Figure 4:
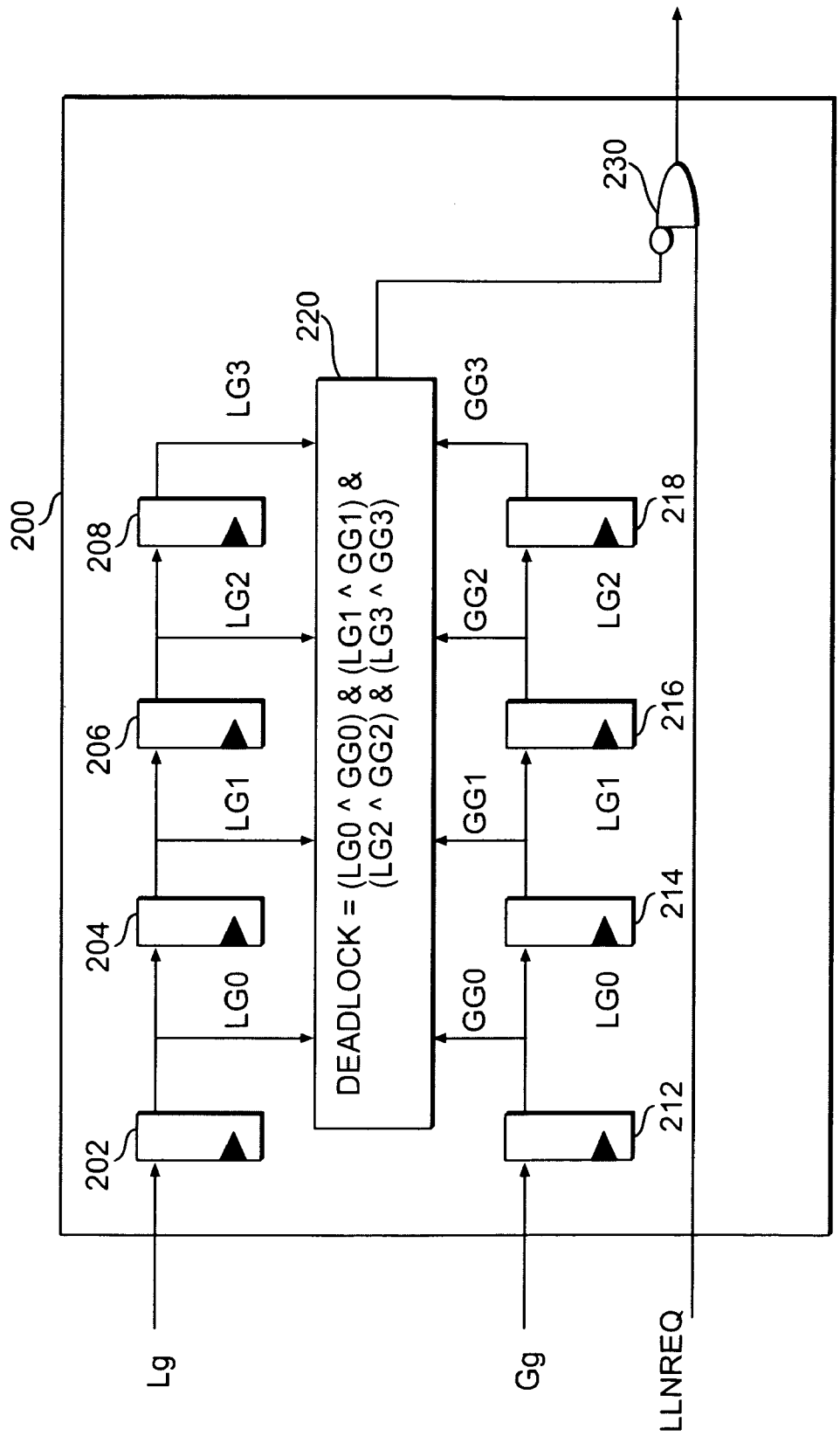
FIG. 4 shows a deadlock recovery circuit according to an example embodiment of the present invention.

FIG. 4 shows a deadlock recovery circuit according to an example embodiment of the present invention. Other embodiments and configurations are also within the scope of the present invention. More specifically, FIG. 4 shows that a deadlock recovery circuit 200 receives a local lane grant (shown as Lg) from the local lane arbiter 62, a global lane grant (shown as Gg) from the global lane arbiter 64 and a local lane request or grant (shown as LLnReq) from the local lane arbiter 62. The local lane grant Lg corresponds to the local lane grant llnkgnt and the global lane grant Gg corresponds to the global lane grant glnkgnt.

The deadlock recovery circuit 200 includes flip flops 202, 204, 206 and 208 that provide delayed local lane grants Lg0, Lg1, Lg2 and Lg3, respectively. That is, Lg0, Lg1, Lg2 and Lg3 are 1-cycle, 2-cycle, 3-cycle and 4-cycle delayed versions of the local lane grant (Lg), respectively.

The deadlock recovery circuit 200 also includes flip flops 212, 214, 216 and 218 that provide delayed global lane grants Gg0, Gg1, Gg2 and Gg3, respectively. That is, Gg0, Gg1, Gg2 and Gg3 are 1-cycle, 2-cycle, 3-cycle and 4-cycle delayed versions of the global lane grant (Gg), respectively.

Each of the local lane signals Lg0, Lg1, Lg2 and Lg3 and each of the global lane signals Gg0, Gg1, Gg2 and Gg3 are input to a calculating device 220 that performs a calculation (as shown in FIG. 4) to determine a deadlock signal. In the formula shown in FIG. 4 for the calculating device 220, $\hat{0}$ represents an Exclusive OR operation and & represents an AND operation. As a result of this calculation in the calculating device 220, the deadlock signal is provided as one input to gate 230. The other input to the gate 230 is the local lane request (shown as LLnReq). Accordingly, when the output of the gate is LOW, the driver 70 may not be driven and the architecture may come out of deadlock.

Accordingly, embodiments of the present invention may include a deadlock recovery circuit to receive a local lane grant from the local lane arbiter and to receive a global lane grant from the global lane arbiter, and the deadlock recovery circuit to provide an output signal to prevent deadlock based on the received local grant and the received global grant.

The local lane and port arbitrations may be initiated based on flit in the memory buffer 54. The global lane arbitration may be initiated by a token (or grant) in the output port and flit in the memory buffer 54.

The global and local port arbitration may allow pipe-stage output buffer retiming, and removal of the output buffer from the router, in reducing crossbar router core latency by one cycle. The area overhead because of additional local lane arbiter may also be reduced as compared to disadvantageous arrangements. For example, embodiments of the present invention may reduce the crossbar router area to an order of $[n*w]^2$. This differs from the crossbar router area of $I*[n*w^2]$ as discussed above.

Embodiments of the present invention may have only one shared crossbar channel for use with a plurality of lanes. Power consumption of components, such as data repeaters, multiplexers and replicated buffers (or memory storage) in each crossbar channel may be reduced as compared to disadvantageous arrangements.

A distributed arbitration scheme and sharing of the crossbar channel may also allow retiming of the output buffers, thereby reducing latency by one cycle as compared to disadvantageous arrangements.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A router comprising:
   a plurality of lanes to receive inbound data from a plurality of different input ports; and
   a shared crossbar channel coupled to the plurality of lanes and to a plurality of output ports, the crossbar channel to receive the inbound data from the plurality of lanes and to provide outbound data to the plurality of output ports based on a first level of arbitration, a second level of arbitration and a third level of arbitration for each input port, the first level of arbitration to include local lane arbitration by a local lane arbiter for the corresponding input port, the second level of arbitration to include global lane arbitration by a global lane arbiter for the corresponding input port and the third level of arbitration to include port arbitration by a port arbiter for the corresponding input port.

2. The router of claim 1, wherein the port arbiter of the corresponding input port is to provide a grant to inbound data from the corresponding input port.

3. The router of claim 1, wherein the local lane arbiter of the corresponding input port is to provide a grant to inbound data from the corresponding input port to the shared crossbar channel.

4. The router of claim 1, wherein the global lane arbiter of the corresponding input port is to provide a grant to outbound data.

5. The router of claim 1, wherein the shared crossbar channel comprises a plurality of multiplexers, and the port arbiter and the global lane arbiter provide select signals to the multiplexers.

6. The router of claim 1, further comprising a deadlock recovery circuit to receive a local lane grant from the local lane arbiter and to receive a global lane grant from the global lane arbiter, and the deadlock recovery circuit to provide an output signal to prevent deadlock based on the received local lane grant and the received global lane grant.

7. The router of claim 1, wherein the first level of arbitration, the second level of arbitration and the third level of arbitration include:
   the port arbiter to grant one inbound data request for the inbound data in each lane;
   the local lane arbiter to generate a local lane grant;
   the global lane arbiter to generate a global lane grant, and data is transferred to the shared crossbar channel in response to the inbound data request, the local lane grant and the global lane grant.

8. The router of claim 1, wherein the port arbiter, the global lane arbiter and the local lane arbiter of the respective input port operate in a lock-step manner to forward data through the router.

9. The router of claim 3, wherein the lane includes a driver to transfer the inbound data to the shared crossbar channel.

10. A router comprising:
    a first lane to receive a plurality of inbound data from a plurality of input ports, each of the plurality of input ports of the first lane having a corresponding local lane arbiter, a corresponding global lane arbiter, a corresponding port arbiter and a corresponding driver associated with the respective input port;
    a second lane to receive a plurality of inbound data; and
    a crossbar channel to receive the inbound data from the first lane and the second lane and to provide outbound data to an output port based on signals from the local lane arbiter of a corresponding one of the ports, the global lane arbiter of a corresponding one of the ports and the port arbiter of a corresponding one of the ports.

11. The router of claim 10, wherein each of the plurality of input ports of the second lane includes a corresponding local lane arbiter, a corresponding global lane arbiter, a corresponding port arbiter and a corresponding driver associated with the respective input port.

12. The router of claim 10, wherein the port arbiter of the corresponding one of the ports is to provide a grant to inbound data from the corresponding one of the input ports associated with the first lane.

13. The router of claim 10, wherein the local lane arbiter of the corresponding one of the ports is to provide a grant to inbound data from the corresponding one of the input ports to the crossbar channel.

14. The router of claim 10, wherein the global lane arbiter of the corresponding one of the ports is to provide a grant to the outbound data.

15. The router of claim 10, further comprising a deadlock recovery circuit to receive a local lane grant from the local lane arbiter and to receive a global lane grant from the global lane arbiter, and the deadlock recovery circuit to provide an output signal to prevent deadlock based on the received local lane grant and the received global lane grant.

16. The router of claim 10, wherein the local lane arbiter provides a first level of arbitration, the global lane arbiter provides a second level of arbitration and the port arbiter provides a third level of arbitration.

17. The router of claim 10, wherein the port arbiter to grant one inbound data request for the inbound data in each lane, the local lane arbiter to generate a local lane grant, the global lane arbiter to generate a global lane grant, and the first lane to transfer data to the crossbar channel in response to the inbound data request, the local lane grant and the global lane grant.

18. The router of claim 10, wherein the port arbiter, the global lane arbiter and the local lane arbiter of the respective input port operate in a lock-step manner to forward data through the router.

* * * * *